United States Patent Office

3,185,686
Patented May 25, 1965

---

3,185,686
PYRAZINE DERIVATIVES
Bruno Camerino and Giorgio Palamidessi, Milan, Italy, assignors to Società Farmaceutici Italia, Milan, Italy, a corporation of Italy
No Drawing. Original application July 12, 1960, Ser. No. 42,236. Divided and this application Sept. 20, 1961, Ser. No. 139,347
Claims priority, application Great Britain, July 14, 1959, 24,146/59; Mar. 14, 1960, 8,830/60 and 8,831/60; Apr. 25, 1960, 14,400/60
8 Claims. (Cl. 260—250)

This application is a division of application Serial No. 42,236, filed July 12, 1960, abandoned in favor of continuation-in-part Serial No. 222,949, now Patent No. 3,098,069.

Our invention relates to 3- and 3,5-substituted 2-aminopyrazine derivatives of the general formula:

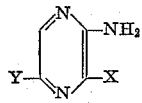

wherein X represents Br or alkoxy groups, preferably $OCH_3$ or $OC_2H_5$; Y represents H or Br.

It has been found that a number of these derivatives are valuable intermediaries in the synthesis of dyestuffs as well as of therapeutically useful substances, among which 3-alkoxy-2-sulfapyrazines should be mentioned, this class of sulfonamides being the subject of the above-mentioned U.S. patent application Serial No. 42,236.

The process steps of the invention and their mutual interrelationship are illustrated schematically on the following diagram:

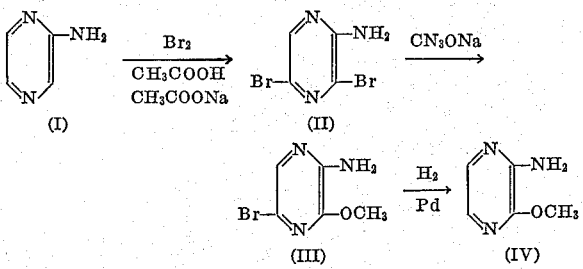

Taking 2-amino-pyrazine (I) as the starting material for the invention, it has been found that it may be brominated to yield the new substance, 3,5-dibromo-2-aminopyrazine (II), by reacting with bromine in the presence of an alkali or alkaline earth metal salt of a weak acid. The 2-amino-pyrazine (I) is dissolved in a suitable polar solvent such as acetic acid, with preferably not less than 2 mols of bromide, at a preferred temperature of from about —5° C. to +30° C., and advantageously in the presence of 1–3 mols of alkaline or alkaline earth salts of weak acids such as sodium acetate, calcium acetate, sodium formate and the like.

New derivatives of amino-pyrazine are prepared, of the general formula:

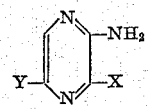

wherein X represents alkoxy, and preferably $OCH_3$ or $OC_2H_5$; and Y represents Br, H, such as 2-amino-3-methoxy-5-bromo-pyrazine (III) and 2-amino-3-methoxy-pyrazine (IV).

Compound III and higher alkoxy compounds can be obtained by reacting 3,5-dibromo-2-amino-pyrazine (II) with alkali metal alcoholates (i.e. alkali metal methyl- ates or ethylates for $X=OCH_3$ or $OC_2H_5$) so that the bromine in the 3-position is replaced, while the bromine in the 5-position does not react and remains unaffected.

To make compound IV and higher alkoxy compounds the bromine in the 5-position can be replaced by a hydrogen atom, namely by hydrogenation in the presence of a catalyst such as palladium on charcoal. In some cases an alkali or tertiary amine, such as sodium or potassium hydroxide or triethylamine is also present, advantageously.

The invention is illustrated by the following examples, which illustrate preferred embodiments, and are not intended to limit the invention.

EXAMPLE 1

*2-amino-3,5-dibromo-pyrazine (II)*

112.7 ml. of bromine in 375 ml. of acetic acid are slowly added at 0° to +2° C., while stirring, to a solution of 95.11 g. of 2-amino-pyrazine and 326.5 g. of acetic acid trihydrate ($CH_5COONa \cdot 3H_2O$) in 1480 ml. of acetic acid. This addition requires about 2–3 hours and it is carried out in the dark. The mixture is then allowed to stand at room temperature (25°–30° C.) for 15–16 hours. About 1.5 liters of acetic acid are distilled off under vacuum (12–14 mm. Hg) at 35° C. and the brown and viscous residue is poured into 500 g. of ice water under stirring. Aqueous 20% sodium hydroxide is added in order to obtain a pH=8 and then the product is filtered and air-dried. The air-dried product is extracted 6 times with 150 ml. of ether; the filtered ethereal solutions are evaporated to dryness and the residue (50–52 g.) is crystallyzed from hot water.

Yield: 34.36 g. of II, melting at 114° C.

EXAMPLE 2

*2-amino-3-methoxy-5-bromo-pyrazine (III)*

7 g. of 2-amino-3,5-dibromo-pyrazine (II) are boiled for 9 hours in a methanolic solution of sodium methylate (obtained from 0.65 g. of Na and 18.5 ml. of methanol). By cooling, a crystalline product is obtained, which is filtered and washed once with methanol and 2–3 times with water.

Yield: 5.4 g. of III, melting at 138° C.

Other corresponding 3-alkoxy compounds, such as the 3-ethoxy compound, are prepared in similar manner.

EXAMPLE 3

*2-amino-3-methoxy-pyrazine (IV)*

3 g. of 2-amino-3-methoxy-5-bromo-pyrazine (III) are hydrogenated in methanolic solution at room temperature and at atmospheric pressure, in the presence of 1 g. of palladium over charcoal (10%) and 0.9 g. of potassium hydroxide. When the stoichiometric amount of hydrogen is absorbed, the suspension is filtered and the filtrate is evaporated to dryness. The residue is extracted with acetone; the acetonic solution is evaporated and the residue (1.8 g. of raw IV, melting at 75°–82° C.) is crystallized from cyclohexane.

Yield: 1.5 g. of pure IV, melting at 85° C.

Other corresponding 3-alkoxy compounds, such as the 3-ethoxy compound, are prepared in similar manner.

We claim:

1. A 2-amino-pyrazine derivative of the formula:

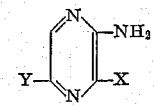

wherein X is a radical of the group consisting of Br, $OCH_3$, and $OC_2H_5$; Y is a radical of the group consisting of H and Br, provided that when X is Br, Y is also Br.

2. 2-amino-3,5-dibromo-pyrazine.
3. 2-amino-3-methoxy-5-bromo-pyrazine.
4. 2-amino-3-methoxy-pyrazine.
5. 2-amino-3-ethoxy-pyrazine.
6. A process comprising treating 2-amino-pyrazine with bromine in the presence of a salt of acetic acid the cation of which is taken from the group consisting of sodium and potassium, at a temperature between −5° and 30° C., to produce 2-amino-3,5-dibromo-pyrazine.
7. 2-amino-3-ethoxy-5-bromo-pyrazine.
8. A process comprising treating 2-amino-3,5-dibromo-pyrazine, dissolved in a solvent selected from the group consisting of methanol and ethanol, with a member selected from the group consisting of sodium methylate, potassium methylate, sodium ethylate and potassium ethylate, at the boiling point temperature of the solvent employed, to produce a member selected from the group consisting of 2-amino-3-methoxy-5-bromo-pyrazine and 2-amino-3-ethoxy-5-bromo-pyrazine.

References Cited by the Examiner

UNITED STATES PATENTS

| | | | |
|---|---|---|---|
| 2,494,524 | 1/50 | Sprague | 260—239.7 |
| 2,891,953 | 6/59 | Clark et al. | 260—239.7 |
| 2,927,112 | 3/60 | Steck | 260—239.7 |
| 3,004,027 | 10/61 | Gordon et al | 260—250 |

OTHER REFERENCES

Elderfield: Heterocyclic Compounds, vol. 6 (1957), page 399.

Karmas et al., J. Amer. Chem. Soc., vol. 79 (1957), pages 680–4.

McDonald et al.: J. Amer. Chem. Soc., vol. 69 (1947), pages 1034–7

Ellington: J. Amer. Chem. Soc., 71 (1949), pages 2798–2800.

IRVING MARCUS, *Primary Examiner.*

WALTER A. MODANCE, *Examiner.*